United States Patent
Ludington (10) Patent No.: US 6,476,973 B1
(45) Date of Patent: Nov. 5, 2002

(54) COMPOUND SURFACE TO AID IN THE FABRICATION OF A LENS WITH A PLANO SURFACE

(75) Inventor: Paul D. Ludington, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 80 days.

(21) Appl. No.: 09/782,432

(22) Filed: Feb. 13, 2001

(51) Int. Cl.⁷ .................................................. G02B 3/00
(52) U.S. Cl. ...................... 359/642; 359/710; 359/718; 359/719
(58) Field of Search ................................ 359/642, 719, 359/710, 718; 264/1.1–2.1

(56) References Cited

U.S. PATENT DOCUMENTS

| | | |
|---|---|---|
| 3,833,347 A | 9/1974 | Angle et al. .................. 65/32.5 |
| 4,139,677 A | 2/1979 | Blair et al. .................. 428/409 |
| 4,168,961 A | 9/1979 | Blair .............................. 65/66 |
| 4,530,570 A * | 7/1985 | Scifres et al. ................ 359/668 |
| 4,629,489 A | 12/1986 | Hirota et al. .................. 65/102 |
| 4,734,118 A | 3/1988 | Marechael et al. ........... 65/102 |
| 4,797,144 A | 1/1989 | DeMeritt et al. ............. 65/102 |
| 4,836,840 A | 6/1989 | Hirota et al. .................. 65/323 |
| 4,883,528 A | 11/1989 | Carpenter et al. ............ 65/275 |
| 4,897,101 A | 1/1990 | Carpenter et al. .............. 65/64 |
| 4,929,265 A | 5/1990 | Carpenter et al. .............. 65/64 |
| 4,964,903 A | 10/1990 | Carpenter et al. ............ 65/275 |
| 5,227,917 A | 7/1993 | Kubo et al. .................. 359/642 |
| 5,718,850 A | 2/1998 | Takano et al. ................ 264/2.4 |
| 5,900,993 A * | 5/1999 | Betensky ..................... 359/710 |
| 5,917,660 A * | 6/1999 | Ohtaki ........................ 359/710 |
| 6,088,170 A * | 7/2000 | Lee et al. .................... 359/710 |

\* cited by examiner

Primary Examiner—Scott J. Sugarman
Assistant Examiner—M. Hasan
(74) Attorney, Agent, or Firm—Mark G. Bocchetti (57) ABSTRACT

A molded glass lens is taught that includes a molded three-dimensional reference surface at a first end of the lens body, a first molded optical surface interrupting the three-dimensional reference surface, and a molded second optical surface at a second end of the lens body. The first and second optical surfaces may be plano, convex or concave. The molded three-dimensional reference surface is curvilinear and may be a spherical, aspherical or conical segment. The molded lens may include a second molded three-dimensional reference surface at the second end of the lens body. The molded three-dimensional reference surface is of a specified shape and location with respect to the first and second optical surfaces. By physically locating the lens with the molded three-dimensional reference surface and one of the first or second optical surfaces, the lens can be held in a given orientation. Thus, the molded reference surface(s) at the end(s) of the cylindrical body allow for accurate and safe capture, positioning, handling, and placement for subsequent finishing-operations, allowing for the creation of one or more additional lens datums.

22 Claims, 8 Drawing Sheets

COMPOUND SURFACE TO AID IN THE FABRICATION OF A LENS WITH A PLANO SURFACE

FIELD OF THE INVENTION

This present invention relates generally to glass optical elements, and more particularly to molded glass optical elements with datum(s) formed therein in the molding process that decrease the difficulty of subsequent manufacturing steps.

BACKGROUND OF THE INVENTION

Various methods and apparatus for the compression molding of glass optical elements are known in the prior art. With these methods and apparatus, optical element preforms sometimes referred to as gobs are compression molded at high temperatures to form glass lens elements. The basic process and apparatus for molding glass elements is taught in a series of patents assigned to Eastman Kodak Company. Such patents are U.S. Pat. No. 3,833,347 to Engle et al., U.S. Pat. No. 4,139,677 to Blair et al., and U.S. Pat. No. 4,168,961 to Blair. These patents disclose a variety of suitable materials for construction of molds used to form the optical surfaces in the molded optical glass elements. Those suitable materials for the construction of the molds include glasslike or vitreous carbon, silicon carbide, silicon nitride, and a mixture of silicon carbide and carbon. In the practice of the process described in such patents, a glass preform or gob is inserted into a mold cavity with the mold being formed out of one of the above mentioned materials. The molds reside within a chamber in which is maintained a non-oxidizing atmosphere during the molding process. The preform is then heat softened by increasing the temperature of the mold to thereby bring the preform up to a viscosity ranging from $10^7$–$10^9$ poise for the particular type of glass from which the preform has been made. Pressure is then applied to force the preform to conform to the shape of the mold cavity. The mold and preform are then allowed to cool below the glass transition temperature of the glass. The pressure on the mold is then relieved and the temperature is lowered further so that the finished molded lens can be removed from the mold.

Molded glass lenses may be manufactured with upper and lower molds residing in a cylindrical mold sleeve (U.S. Pat. No. 5,718,850 to Takano et al.). In such a process the final molded lens element is typically cylindrical (and circular in cross-section). The diameter and concentricity of the cylinder are critical to subsequent handling, positioning and mounting operations. Therefore, it has been necessary to control the diameter of the cylinder either during molding, or during a subsequent grinding operation. Controlling the diameter during molding is difficult. Although a cylindrical mold sleeve produces a lens with a well-constrained outer diameter, molding tool life can be decreased due to a variety of factors. One contributor to decreased molding tool life is variability in the volume of the preforms. The preforms are the glass material (usually in the shape of a sphere) from which the lenses are molded. If the preform volume is slightly larger than the mold cavity, the excess glass can exert excessive force on the cylindrical sleeve during molding. It can also become difficult to remove the lenses from the cylindrical sleeve after multiple molding cycles.

Grinding a specified outer diameter on a lens after molding is often referred to as centering. As lens elements become smaller it becomes increasingly difficult to accurately center such lens elements as well as to position and align such elements in subsequent assembly operations.

A lens geometry is needed which allows for accurate centering, handling, positioning and mounting operations and that does not rely on the accuracy of the outside diameter of the cylindrical body of the lens as molded.

SUMMARY OF THE INVENTION

It is therefore an object of the present invention to provide a molded lens having a geometry that allows for accurate centering, handling, positioning and mounting operations after molding.

It is a further object of the present invention to provide a molded lens having a geometry that does not rely on the accuracy of the outside diameter of the cylindrical body of the lens for post molding operations.

Yet another object of the present invention is to provide a molded lens having a geometry that is not critically dependent upon optical element preform volume for the creation of a reference surface.

Briefly stated, the foregoing and numerous other features, objects and advantages of the present invention will become readily apparent upon a review of the detailed description, claims and drawings set forth herein. These features, objects and advantages are accomplished by providing a molded lens that includes a molded three-dimensional reference surface at a first end of the lens body, a first molded optical surface interrupting the three-dimensional reference surface, and a molded second optical surface at a second end of the lens body. The first and second optical surfaces may be plano, convex or concave. The molded three-dimensional reference surface is curvilinear and may be a spherical, aspheriical or conical segment. The molded three-dimensional reference surface at the first end of the lens body may be thought of as being interrupted or intercepted by the first molded optical surface. The lens body (that portion of the lens that is both between the second optical surface and the molded three-dimensional reference surface, and outside the diameters of the second optical surface and the molded three-dimensional reference surface) may be allowed to partially or fully free-form during molding, or may be constrained during molding to provide a generally cylindrical shape to the lens body. If the lens body is allowed to free-form, it is subsequently subjected to a grinding operation to yield a generally cylindrical shape. Whether the generally cylindrical shape of the lens body is accomplished by molding or grinding, the generally cylindrical shape may include an addition datum surface(s) formed therein. Also, the molded lens of the present invention may include a second molded three-dimensional reference surface at the second end of the lens body. If the molded lens includes a second molded three-dimensional reference surface at the second end of the lens body, that second reference surface will be interrupted by the second optical surface. The first and second optical surfaces are designed to image light from an object point to an image point. The molded three-dimensional reference surface is of a specified shape and location with respect to the first and second optical surfaces. By physically locating the lens with the molded three-dimensional reference surface and one of the first or second optical surfaces, the lens can be held in a given orientation. Thus, the molded reference surface(s) at the end(s) of the cylindrical body allow for accurate and safe capture, positioning, handling, and placement for subsequent finishing operations, allowing for the creation of one or more additional lens datums. These finishing operations can include, but are not limited to, grinding, polishing, and cutting. These functions of capture, positioning, handling, and placement for subsequent operations can be performed using a centering cup that engages the molded reference surface(s) at the end(s) of the cylindrical body thereby allowing subsequent operations to be performed without reliance on the outside diameter of the lens body.

The lens of the present invention can be made with an angled plano optical surface, a convex optical surface, and a lens datum. This lens datum can then be used for subsequent processing operations (such as grinding) to add additional datums to the lens. These additional datums can be placed in a precise location with respect to the optical axis of the lens element. One of the additional lens datums can be a cylindrical surface that enables mounting of the lens either in a V-groove type structure or in a precise tube. In addition, the lens can be molded without the need for a precisely controlled cylindrical preform. The lens can be centered using existing centering equipment. Because the lens does not have to be held on the piano surface, it reduces the chances of scratching this surface. Scratches can lead to scatter and reduce the light transmitted by the lens. This is particularly important for situations where the beam diameter of the light directed onto the piano optical face may be only 50 microns such as those optical elements used in conjunction with optical fibers. In such an instance, a scratch of only a few microns in size could cause a measurable decrease in the amount of light transmitted by the lens to the receiving fiber.

Either as a result of a post-molding grinding operation or as result of the molding operation itself, the lenses of the present invention typically will be "generally cylindrical". Further, such lenses will typically be circular in cross-section. However, there may be lens applications where it is beneficial to form generally cylindrical lens which, in cross section perpendicular to lens axis are not circular (e.g.—elliptical). Thus, the term "generally cylindrical" as used herein is intended to include cylindrical lenses that may or may not be circular in cross section. In addition, the term "generally cylindrical" as used herein is intended to include those lenses which have datum(s) formed in the cylindrical surface thereof such as, for example, flat datum(s) and recessed datum(s) as will be discussed in more detail hereafter. Therefore, the formation of such datum(s) in the cylindrical surface of a lens will not remove such lens from the definition of "generally cylindrical" as used herein.

DETAILED DESCRIPTION OF THE INVENTION

Figure 1:
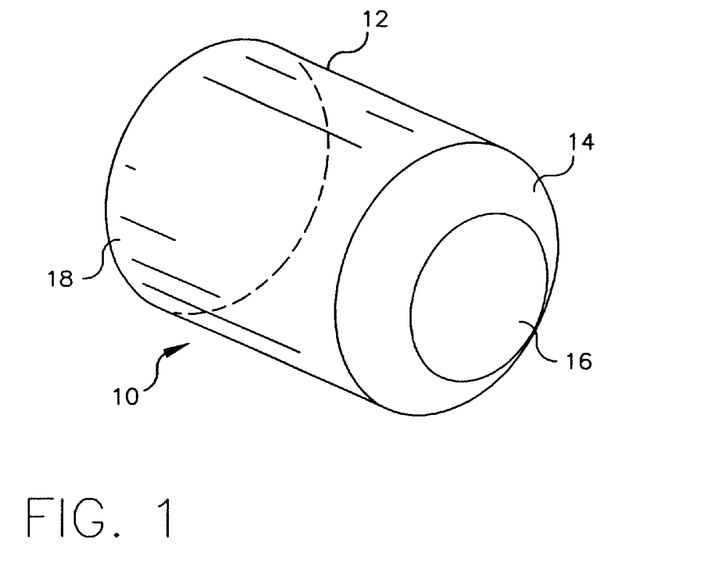
FIG. 1 is a perspective view of an exemplary lens of the present invention including a three-dimensional reference surface.
Figure 2:
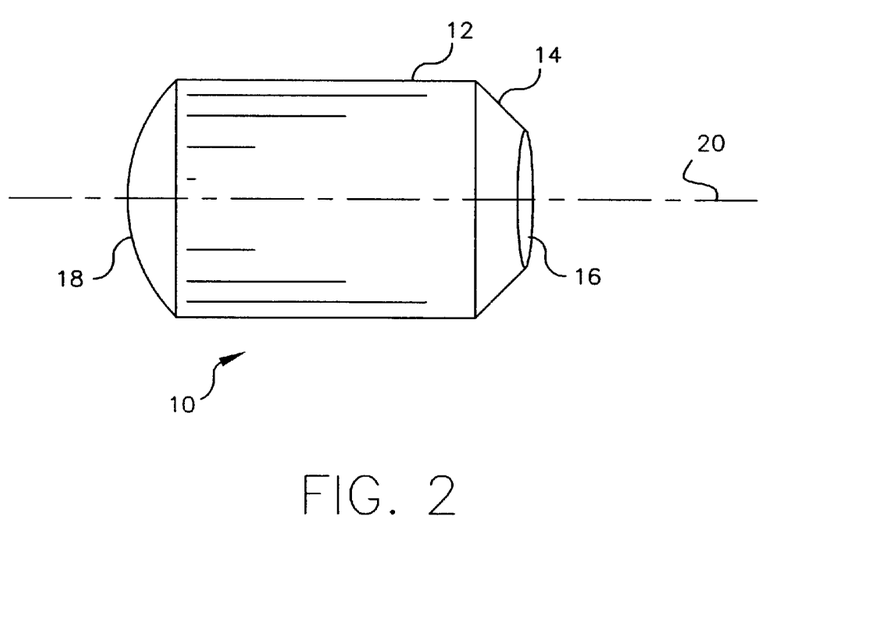
FIG. 2 is a side elevational view of the exemplary lens depicted in FIG. 1.

Turning first to FIGS. 1 and 2, there is depicted an exemplary molded glass lens 10 of the present invention. Lens 10 includes a lens body 12 that is cylindrical (and in this example, circular, in cross-section). At a first end of lens body 12 is a molded three-dimensional reference surface 14. There is a first molded optical surface 16 abutting and formed integrally with molded three-dimensional reference surface 14. The molded three-dimensional reference surface 14 is curvilinear and may be a spherical, aspherical or conical segment. As such, the first molded optical surface 16 may be thought of as interrupting the three-dimensional reference surface. That is, the first molded optical surface 16 interrupts what would be the natural extension or projection of the molded three-dimensional reference surface 14. There is a molded second optical surface 18 at a second end of the lens body 12. The first and second optical surfaces may be plano, convex or concave. As depicted in FIGS. 1 and 2, first molded optical surface 16 is plano and molded second optical surface 18 is convex. Note that although first molded optical surface 16 is plano, it does not have to be perpendicular to the cylindrical axis 20 of lens 10. This geometry has particular advantage in some collimating lens applications which will be discussed in more detail hereinafter.

Figure 3:
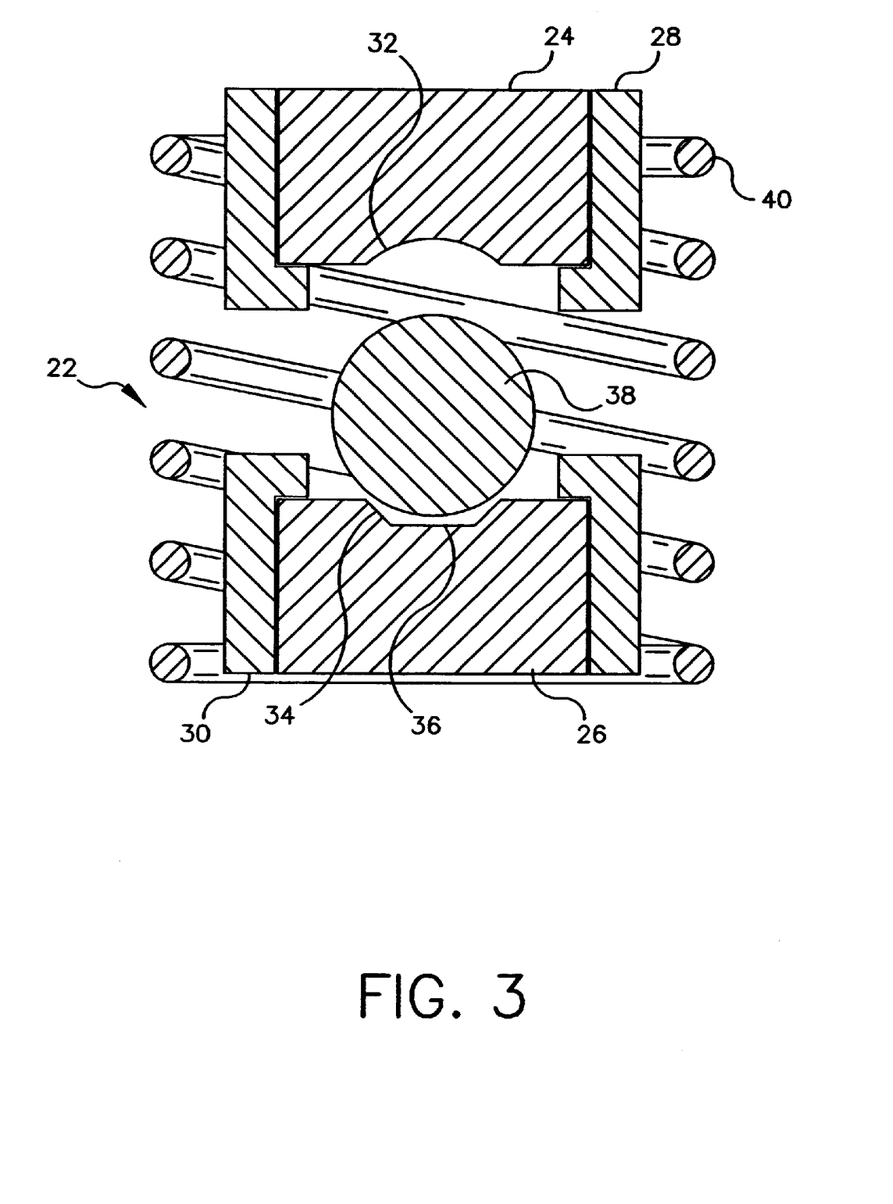
FIG. 3 is a cross-sectional schematic view of an apparatus with a preform positioned therein at the beginning of a molding sequence.
Figure 4:
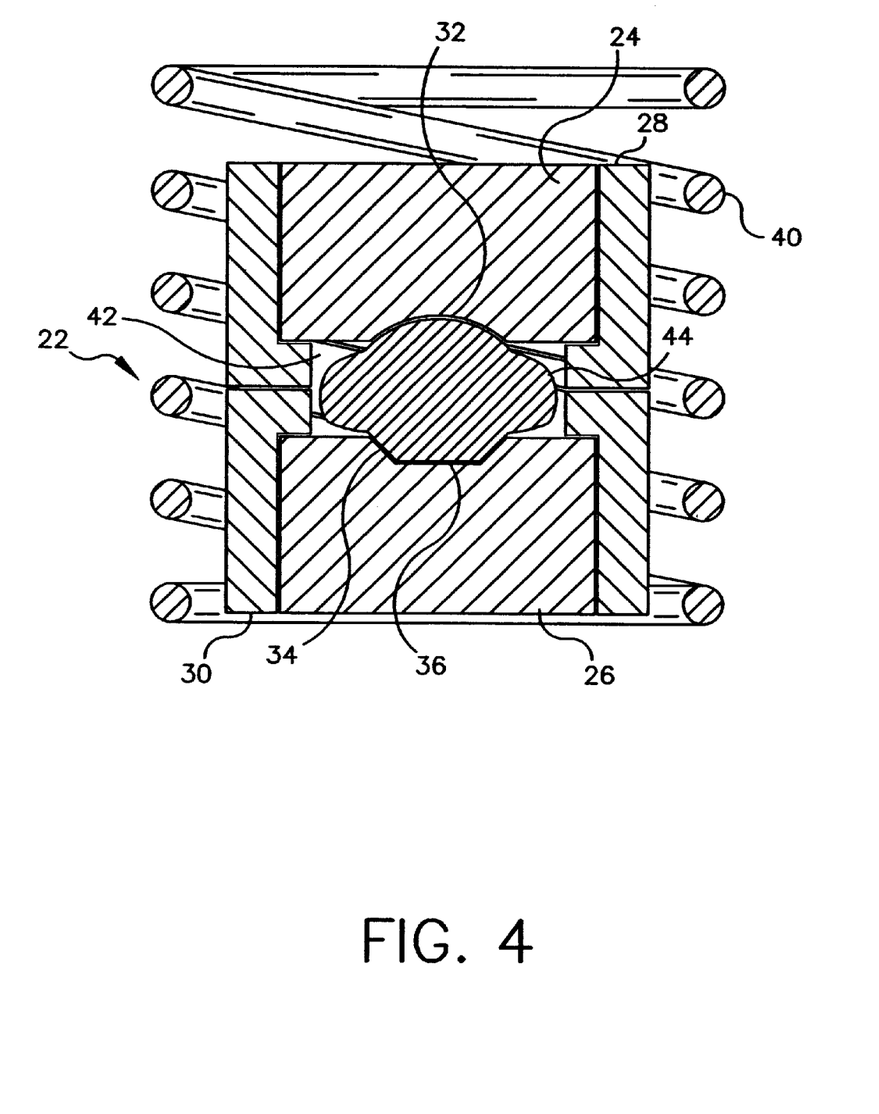
FIG. 4 is a cross-sectional schematic view of the apparatus of FIG. 3 with the apparatus actuated to compress the preform to yield an exemplary molded lens of the present invention with a free-form lens body or perimeter.
Figure 5:
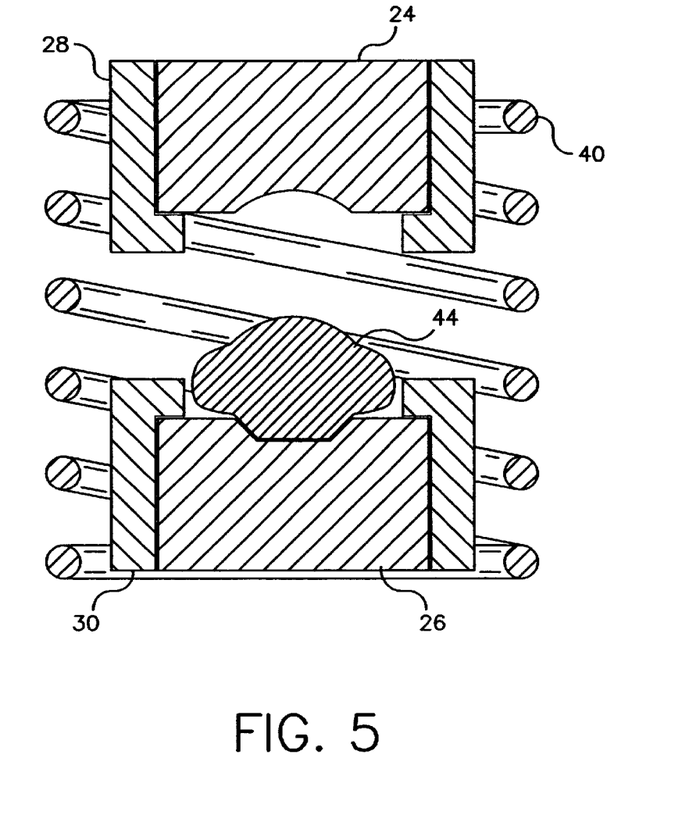
FIG. 5 is a cross-sectional schematic view of the apparatus of FIGS. 3 and 4 with the apparatus actuated to release the exemplary molded lens with a free-form lens body or perimeter formed thereby.

Looking next in FIGS. 3 through 5, there is shown a cross-sectional view of an apparatus 22 for producing the molded glass lens 10 of the present invention depicting a molding sequence. The apparatus 22 of the present invention includes an upper mold 24 and a lower mold 26. Upper mold 24 resides in an upper mold support 28 and lower mold 26 resides in a lower mold support 30. The upper mold 24 includes a first optical mold surface 32. First optical mold surface 32 is depicted as being concave but may include other optical geometries of such as convex or plano features. The lower mold 26 includes a three-dimensional reference mold surface 34 and a second optical mold surface 36.

Figure 5A:
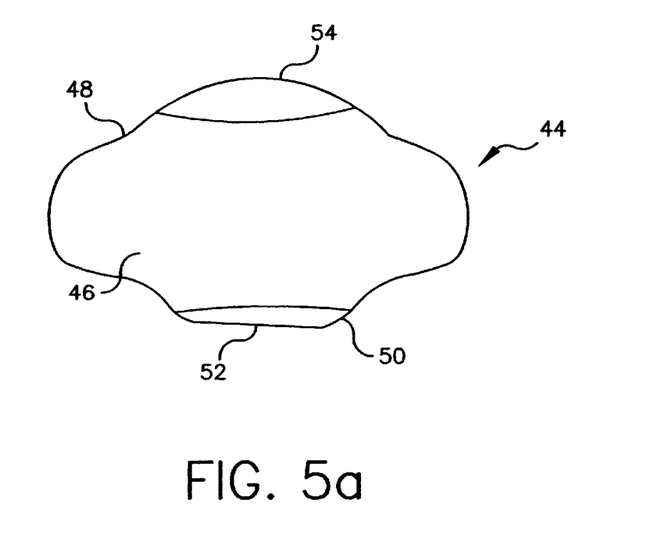
FIG. 5a is a side elevational view of an exemplary lens as molded with the apparatus depicted in FIG. 5.

Surrounding upper and lower molds 24 and 26 is an induction heating coil 40. In operation, a glass preform 38 (depicted as being spherical) with an optical quality surface is inserted into the depression in the lower mold 26 defined by the three-dimensional reference mold surface 34 and the second optical mold surface 36. Through actuation of the induction heating coil 40, the temperature of the upper and lower molds 24, 26 and preform 38 is raised to at least the glass transition temperature of the preform 38. Then the preform 38 is pressed between the upper and lower molds 24, 26 causing the preform 38 to deform as depicted in FIG. 4, thereby imparting to the preform 38 first and second optical mold surfaces 32, 36 and molded three-dimensional reference surface 14. Compression is performed (by means not shown) to a positive stop. at which point the molds 24, 26 and the preform 38 are allowed to cool to below the glass transition temperature and preferably to below the annealing point of the glass. The volume of the cavity 42 defined by molds 24, 26 and mold support 28, 30 within the mold position as depicted in FIG. 4 is significantly greater than the volume of the preform 38. Once the molds 24, 26 and the preform 38 cool molds 24, 26 are parted as depicted in FIG. 5. In such manner, a molded glass lens 44 (See FIG. 5a) is molded which includes a lens body 46 with a free-formed perimeter 48, a molded three-dimensional reference surface 50, a first molded optical surface 52 abutting and formed integrally with molded three-dimensional reference surface 50, and a molded second optical surface 54. The molded three-dimensional reference surface 50 is curvilinear and may be a spherical, aspherical or conical segment.

The free formed perimeter 48 is then preferably subjected to a grinding operation to produce a cylindrical lens body. In this manner, a finished lens 10 such as depicted in FIG. 1 is produced. The grinding operation can be efficiently performed as centering of the lens 44 is accomplished using the three-dimensional reference surface 50. Molds 24, 26 may be made of a machinable material (such as electroless nickel) thereby allowing both molds 24, 26 to be machined.

Alternatively, molds 24, 26 may also be made from a material that can not be easily machined, such as glass or ceramic, by forming molds 24, 26 by machining mold tools which have surfaces that are negatives of the desired surfaces for molds 24, 26. Then molds 24, 26 can be molded using such negative or inverse mold tools.

It should be understood that upper and lower molds 24, 26 are not necessarily directly heated by induction. Rather, upper and lower molds 24, 26 preferably reside in a mold supports 28, 30 fabricated from a conductive material such as graphite or molybdenum. The mold supports 28, 30 are heated by the induction field and the upper and lower molds 24, 26 are heated indirectly by conduction and radiant heat transfer.

It should be understood that three-dimensional reference mold surface 34 does not have to be of the highest optical quality, since three-dimensional reference surface 14 will not be used to transmit light. However, the quality of three-dimensional reference mold surface 34 will affect the centering operation. If three-dimensional reference surface 50 is a spherical surface, it is desirable to choose a radius for such surface such that the center of curvature of surface 52 and the center of curvature of surface 54 are not coincident. Separation of the centers of curvatures of these two surfaces improves the ability to align the lens during the centering operation.

Figure 6:
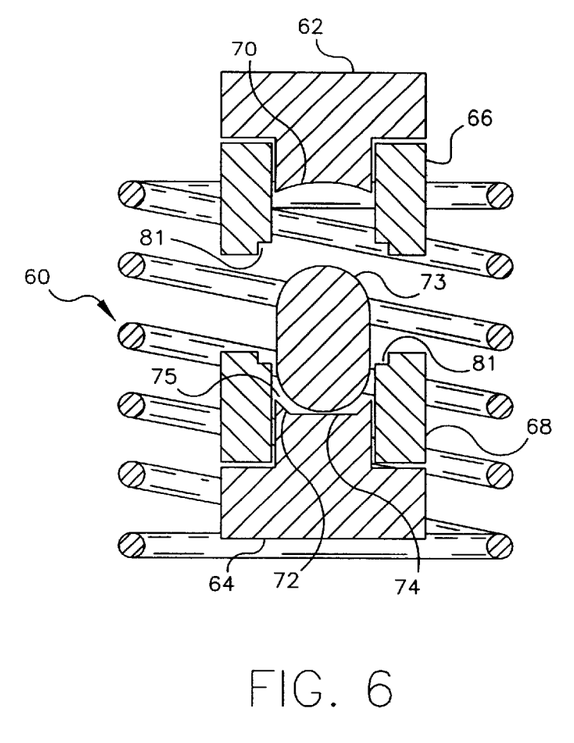
FIG. 6 is a cross-sectional schematic view of an alternative apparatus to that shown in FIGS. 3 through 5 for molding a lens of the present invention.
Figure 6A:
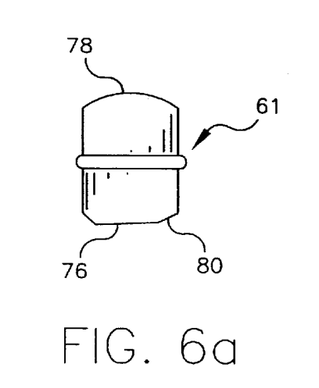
FIG. 6a is a side elevational view of an exemplary lens as molded with the apparatus depicted in FIG. 6.

Looking next at FIGS. 6 and 6a, there is shown an alternative apparatus 60 for molding an exemplary molded glass lens 61 of the present invention. Apparatus 60 includes an upper mold 62 and a lower mold 64. Upper mold 62 resides in an upper mold sleeve 66 and lower mold 64 resides in a lower mold sleeve 68. The upper mold 62 includes a first optical mold surface 70. First optical mold surface 70 is depicted as being concave but may include other optical geometries such as convex or plano features. The lower mold 64 includes a three-dimensional reference mold surface 72 and a second optical mold surface 74. Operation of apparatus 60 is similar to operation of apparatus 22. A glass preform 73 with an optical quality surface is inserted into the lower mold sleeve 68 and on top of lower mold 64. The glass preform 73 used in the apparatus 60 as depicted is preferably cylindrical with spherical ends. The spherical ends would have optical quality surfaces. Through actuation of an induction heating coil or other heating means, the temperature of the upper and lower molds 62, 64 and preform 73 is raised to at least the glass transition temperature of the preform 73. Then the preform 73 is pressed between the upper and lower 62, 64 and confined by the upper and lower mold sleeves 66, 68 causing the preform 73 to deform to the shape of the mold cavity 75 defined thereby. In this manner, the first and second optical surfaces 76, 78 and the molded three-dimensional reference surface 80 are imparted to the preform yielding lens 61 as depicted in FIG. 6a. Compression is performed (by means not shown) to a positive stop at which point the molds 62, 64 and the lens 61 are allowed to cool to below the glass transition temperature and preferably to below the annealing point of the glass. At that point, upper and lower molds 62, 64 and upper and lower mold sleeves 66, 68 can be separated and lens 61 can be removed. Preferably, upper and lower mold sleeve 66, 68 join one another in an interlocking arrangement as shown in FIG. 6. Preferably, mold cavity 75 includes an annular channel 81 projecting into upper and lower mold sleeves 66, 68 proximate to where upper and lower mold sleeves 66, 68 are above one another when in molding position. In the embodiment depicted in FIG. 6, one-half of annular channel 81 is formed in upper mold sleeve 66, and one-half of annular channel 81 is formed in lower mold sleeve 68. Annular channel 81 allows for the volume of the preform 73 which is somewhat larger than the volume of the main portion of mold cavity 75. In this manner, lens 61 can be formed with a generally cylindrical shape while avoiding putting too much pressure on upper and lower sleeves 66, 68 during molding operation. In other words, annular channel 810 provides a reservoir into which excess glass can flow. The excess glass that flows into annular channel 810 can be subjected to a subsequent grinding operation and removed thereafter.

Those skilled in the art will recognize that the lens of the present invention could be formed with a mold apparatus similar to that depicted in FIG. 6 but having only a single sleeve rather than a split sleeve. However, a single sleeve would prevent the inclusion of annular channel 81 in the mold cavity. Such a design would have problems associated therewith. These problems are particularly true when molding glass optical elements that are only about 2 mm or less in diameter. Maintaining control of the inner diameter of a bore that is only about 2 mm in diameter is difficult. Furthermore, repeated glass pressing operations tend to degrade the surface quality inside the bore, leading to increased probability of the lens sticking in the mold. In this type of molding operation the variability of preform volume must be controlled very precisely to reduce potential stresses that might damage the sleeve.

The lens of the present invention can be molded to include more than one datum or reference surface. Looking at FIG.

Figure 7:
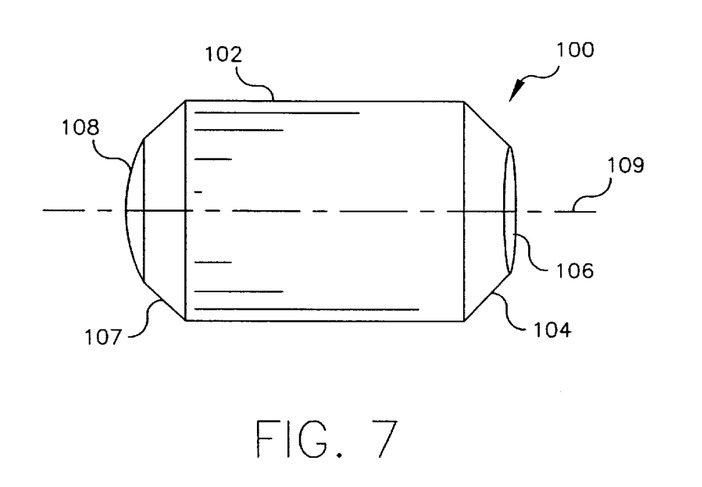
FIG. 7 is a side elevational view of another exemplary molded glass lens of the present invention which includes two three-dimensional reference surfaces.

7, there is depicted another exemplary molded glass lens 100 of the present invention which includes two reference surfaces. Lens 100 includes a lens body 102 that is cylindrical (and in this example, circular in cross-section). At a first end of lens body 102 is a molded three-dimensional reference surface 104. There is a first molded optical surface 106 abutting and formed integrally with molded three-dimensional reference surface 104. The molded three-dimensional reference surface 104 is curvilinear and may be a spherical, aspherical or conical segment. As such, the first molded optical surface 106 may be thought of as interrupting the three-dimensional reference surface 104. That is, the first molded optical surface 106 interrupts what would be the natural extension or projection of the molded three-dimensional reference surface 104. At a second end of lens body 102 is a molded three-dimensional reference surface 107. The molded three-dimensional reference surface 107 is also curvilinear and may be a spherical, aspherical or conical segment. As such, the second molded optical surface 108 may be thought of as interrupting the three-dimensional reference surface 107. There is a second molded optical surface 108 abutting and formed integrally with molded three-dimensional reference surface 107. The first and second optical surfaces may be piano, convex or concave. As depicted in FIG. 7, first molded optical surface 106 is piano and molded second optical surface 108 is convex. Note that although first molded optical surface 106 is piano, it does not have to be perpendicular to the cylindrical axis 109 of lens 100. This geometry has particular advantage in some collimating lens applications which will be discussed in more detail hereinafter. However, for other lens applications which include a piano optical surface it may be preferred to have the piano surface perpendicular to the cylinder and/or optical axis of the lens. This embodiment of the invention allows independent location of the center of curvatures of the two surfaces 104, 107 that are held in the chucks during a centering operation. That is, the location of the lens for grinding does not depend on the surfaces 106, 108 that are used to implement the optical function of the lens 100.

Figure 8:
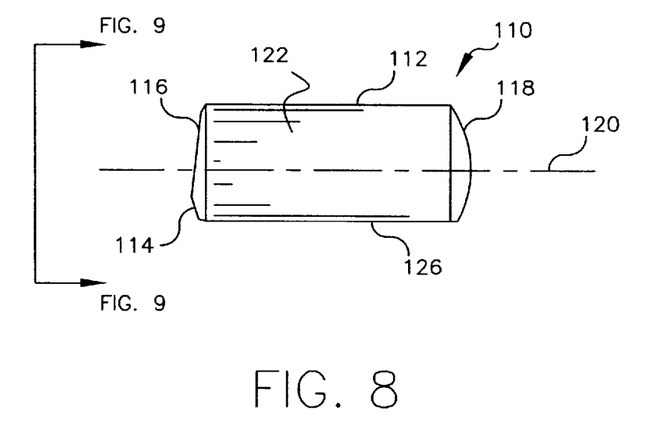
FIG. 8 is a side elevational view of yet another exemplary molded glass lens of the present invention including one three dimensional reference surface and a longitudinal flat reference surface formed the lens body.
Figure 9:
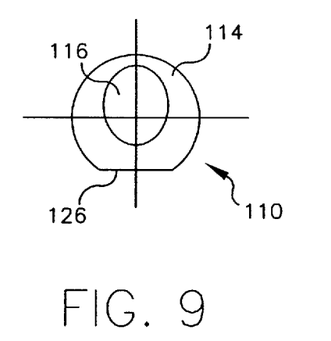
FIG. 9 is a plan view taken from the perspective of line 9—9 of FIG. 8.

FIGS. 8 and 9 show yet another exemplary molded glass lens 110 of the present invention. Exemplary lens 110 is similar to lens 10. Lens 110 includes a lens body 112 that is cylindrical (and in this example, circular in cross-section). At a first end of lens body 112 is a molded three-dimensional reference surface 114. There is a first molded optical surface 116 abutting and formed integrally with molded three-dimensional reference surface 114. The molded three-dimensional reference surface 114 is curvilinear and may be a spherical, aspherical or conical segment. As such, the first molded optical surface 116 may be thought of as interrupting the three-dimensional reference surface. That is, the first molded optical surface 116 interrupts what would be the natural extension or projection of the molded three-dimensional reference surface 114. There is a molded second optical surface 118 at a second end of the lens body 112. The first and second optical surfaces may be piano, convex or concave. As depicted in FIGS. 8 and 9, first molded optical surface 116 is piano and molded second optical surface 118 is convex. As shown, first molded optical surface 116 is piano but is not perpendicular to the cylindrical axis 120 of lens 110. However, first molded optical surface 116 may be formed to be perpendicular to the cylindrical axis 120 of lens 110 depending on the particular lens application.

In this alternate lens embodiment, the molded datum (molded three-dimensional reference surface 114) allows the addition of two other datums. The first added datum is a cylindrical surface 122, the axis of which is coincident with the optical axis of the lens 110. The second added datum is a flat reference surface or datum 126. The flat reference surface 126 is parallel to the axis 120 of the cylindrical datum surface 122. The flat surface 126 can be used during placement of the lens into an assembly to constrain the rotational orientation of the lens about the aspheric axis (which is assumed to be coincident with the axis of the created cylindrical datum). Preferably, datums 122, 126 are formed during the molding process. However, datums 122, 126 may also be formed in subsequent grinding operation(s) after the molding process is completed. When the lens body 112 is allowed to free-form in the molding operation, then it is necessary to form datums 122, 126 in subsequent grinding operations.

Figure 10:
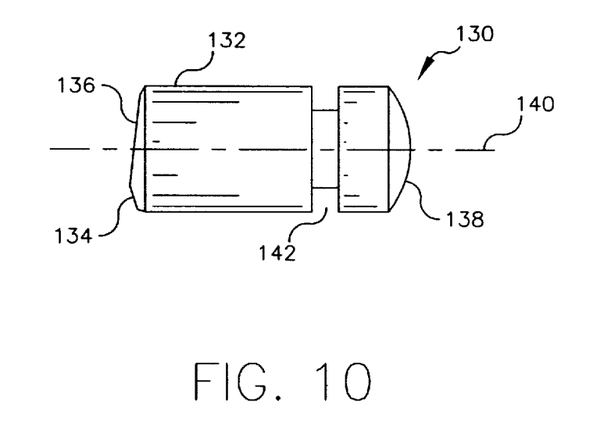
FIG. 10 is a side elevational view of yet another exemplary molded glass lens of the present invention including one three dimensional reference surface and a recessed reference surface formed the lens body.

FIG. 10 shows yet another exemplary molded glass lens 130 of the present invention. Exemplary lens 130 is also similar to lens 10. Lens 130 includes a lens body 132 that is cylindrical (and in this example, circular in cross-section). At a first end of lens body 132 is a molded three-dimensional reference surface 134. There is a first molded optical surface 136 abutting and formed integrally with molded three-dimensional reference surface 134. The molded three-dimensional reference surface 134 is curvilinear and may be a spherical, aspherical or conical segment. As such, the first molded optical surface 136 may be thought of as interrupting the three-dimensional reference surface. That is, the first molded optical surface 136 interrupts what would be the natural extension or projection of the molded three-dimensional reference surface 134. There is a molded second optical surface 138 at a second end of the lens body 132. The first and second optical surfaces 136, 138 may be piano, convex or concave. As depicted in FIG. 10, first molded optical surface 136 is piano and molded second optical surface 138 is convex. As shown, first molded optical surface 136 is piano but is not perpendicular to the cylindrical axis 140 of lens 130. However, first molded optical surface 136 may be formed to be perpendicular to the cylindrical axis 140 of lens 130 depending on the particular lens application. Lens 130 also includes a recess 142 formed therein. Recess 142 would be formed in a subsequent grinding operation after molding, and such recess 142, or one of the surfaces thereof. The recess 142 allows relatively precise axial location of the lens 130. Such a recess 142 could make subsequent placement, inspection, and alignment of the lens 130 in an optical assembly easier. Those skilled in the art will recognize that although recess 142 is preferably annular, recess 142 may comprise one or more recess segments.

As mentioned above, the geometry of lens 10 as depicted in FIG. 1, where the first molded optical surface 16 is piano but does not have to be perpendicular to the cylindrical axis 20 of lens 10 has particular advantage in some collimating lens applications. Looking at FIG. 11, when light is transferred from a first optical fiber 150 to a second optical fiber 152, it is often accomplished with a pair of lenses 154, 156. The first lens 154 collimates the output of the emitting fiber 150, and the second lens 156 focuses that collimated beam 158 into the receiving fiber 152. Other optical components (not shown) may be placed between these two lenses 154, 156 in the collimated beam 158 of light such as dichroic filters, beam splitters, or birefringent materials that separate the beams. For these systems, it is desirable that the collimating optics be small. This minimizes the size of any supplemental optics, and decreases the overall package size. The optics must also work over a wide wavelength and temperature range. Glass optical elements are desired over plastic due to lower thermal and environmental sensitivity.

Figure 11:
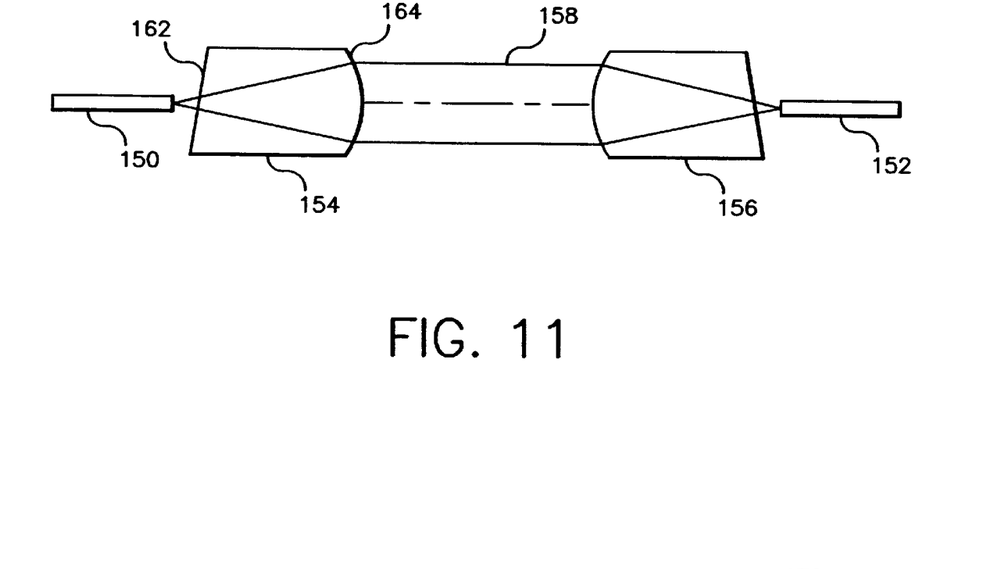
FIG. 11 is a schematic depicting one potential use of two of the lens of the present invention in an optical fiber communications component.

In the manufacture of assemblies that use optical components such as lenses, it is desirable that the lenses have datums that can be used for accurately locating the lenses in the assembly. When using a lens 154 to collimate light from an optic fiber 150, it is not desirable to have an optical surface 162 that are nearly perpendicular to the beams. A perpendicular optical surface may reflect light back along the same path, and back into the fiber. This reflected light could affect the laser source used in telecommunication systems. One possible design for a collimating lens element 154 which would overcome this reflection problem is to have piano optical surface 162 angled to the optical axis, and the second optical surface 164 be a convex asphere.

Thus, the lens of the present invention describes a way of making lenses with an angled rear facet surface and producing a known datum on the lens. The inclusion of the known datum reduces difficulties in the subsequent centering operations.

Figure 12:
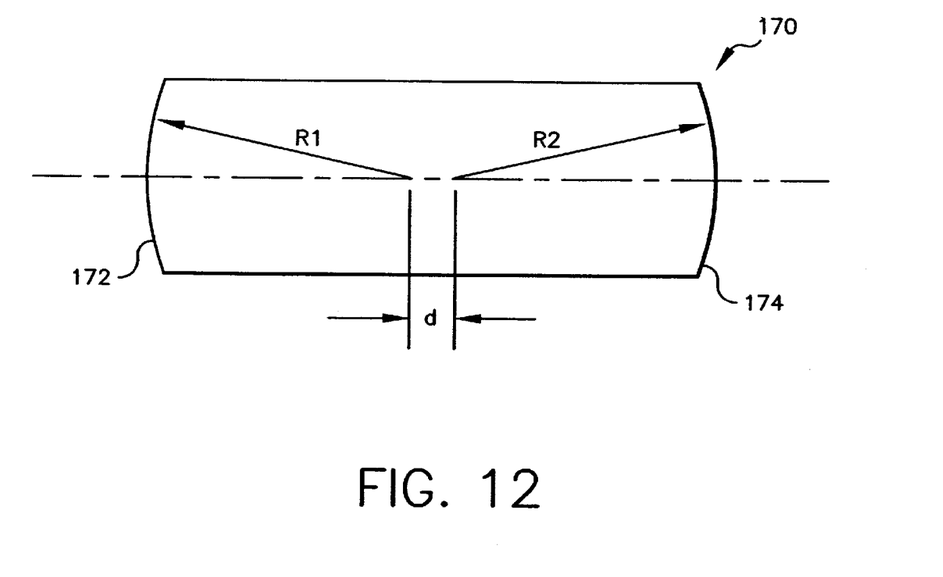
FIG. 12 is a schematic showing typical center of curvature separation, d1, of a prior art lens.

As mentioned above, the lens of the present invention allows more efficient centering operations. When centering lenses, it is desirable that the separation between the center of curvatures of the optical surfaces be a large as possible. FIG. 12 shows a molded glass lens 170 with two convex optical surface 172 and 174 and having corresponding radii of curvature, R1 and R2, respectively. In this case, the center of curvature separation, d, is quite small making it difficult to grind the outside diameter of the lens precisely with respect to the optical axis.

Figure 13:
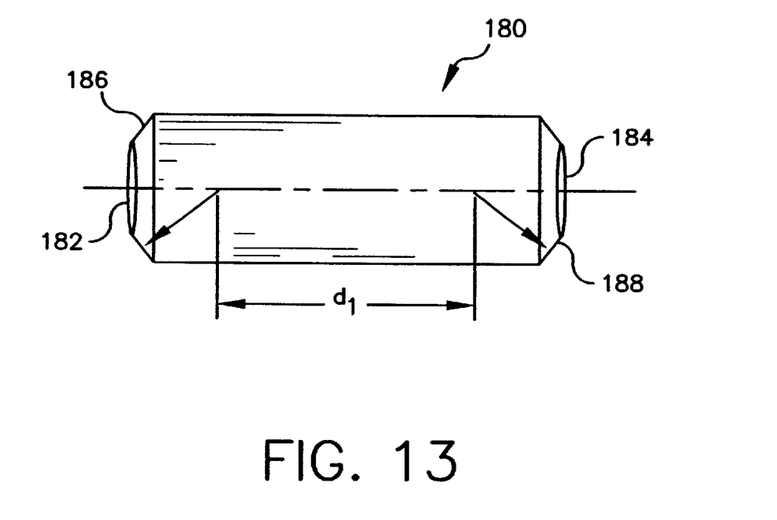
FIG. 13 is a schematic showing how the lens of the present invention can be used to increase the center of curvature separation, $d_1$, of the lens.

In the special case of a sphere, the center of curvature separation is zero and the ability to precisely center the lens become very difficult. A molded glass lens 180 of the present invention is depicted in FIG. 13 which includes convex optical surfaces 182, 184. Convex optical surfaces 182, 184 may both be spherical and of the same radius. By adding additional reference surfaces 186, 188 to the lens 180, the center of curvature separation $d_1$ as defined by the reference surfaces 186, 188 can be substantially increased, making the centering operation much easier.

Figure 14:
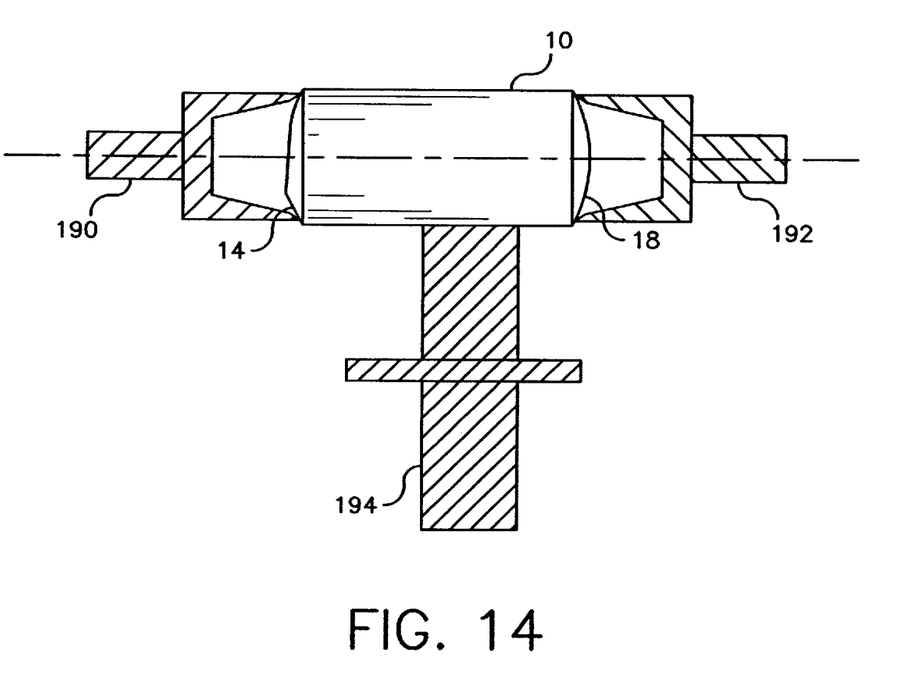
FIG. 14 there is a schematic side elevational view of an exemplary lens of the present invention supported between to centering cups in a post molding grinding operation to achieve a generally cylindrical lens body.

As mentioned above, the molded lens of the present invention allows for ease of centering using standard optical centering equipment. In normal use, this equipment is used to center optical lenses with two spherical surfaces. It is understood that the equipment can also be used to center lenses with aspheric surfaces. Referring to FIG. 14, there is shown an exemplary lens 10 of the present invention (FIG. 1) supported between to centering cups 190, 192. The first centering cup 190 engages three-dimensional reference surface 14. The second centering cup engages the second optical surface 18. As previously noted, the three-dimensional reference surface 14 can be a spherical or aspheric surface, or a section of a cone, and is used as a datum for a centering operation. By way of example, FIG. 14 depicts a lens 10 positioned for removal of excess material using a grinding wheel 194.

EXAMPLE

An exemplary lens of the present invention similar to that depicted in FIGS. 1 and 2 was successfully molded from Schott SF-57 glass. The lens produced was a plano-convex collimator lens intended to be used in an arrangement similar to that shown in FIG. 11. The plano optical surface 16 was inclined by approximately 6° from being perpendicular to the cylindrical axis 20 to reduce back reflections into the transmitting optical fiber. A spherical three-dimensional reference surface 14 was molded into the end of lens 10 that contained the plano optical surface 16. An aspheric optical surface 18 was integrally molded at the opposite end of lens 10. The purpose of the aspheric optical surface 18 is to collimate the optical beam. The apparatus used to form the lens 10 was similar to that depicted in FIG. 3 through 5. A spherical preform 38 was placed into the mold and heated to approximately 500° C. The spherical preform 38 was then compressed between upper and lower molds 24, 26 for approximately 30 seconds and then cooled. Once the upper and lower molds 24, 26 were separated, the molded lens 44 was removed and placed in a plastic tray. Subsequent to molding, the lens 44 was coated with an anti-reflection coating optimized at 1550 nm. Following this, the excess glass was removed using a conventional optical lens centering machine to yield a final lens geometry similar to that shown in FIGS. 1 and 2. Two centering cups 190, 192 were used to align the optical axis of the lens to the mechanical axis of the centering machine similar to the arrangement shown in FIG. 14. One cup 190 contacted the spherical three-dimensional reference surface 14 and the other cup 192 contacted the aspheric optical surface 18.

Those skilled in the art will recognize that although the lenses of the present invention are discussed herein as being individually molded, small versions (having diameters of 2 mm or less) of such lens can be molded in arrays. The upper and lower mold would include cavities for molding multiple lenses as part of a single integrally formed sheet. The individual lenses could then be singulated in a subsequent cutting operation.

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

PARTS LIST 10 molded glass lens
12 lens body
14 three-dimensional reference surface
16 first molded optical surface
18 second molded optical surface
20 cylindrical axis
22 apparatus
24 upper mold
26 lower mold
28 upper mold support
30 lower mold support
32 first optical mold surface
34 three-dimensional reference mold surface
36 second optical mold surface
38 glass preform
40 induction heating coil
42 cavity
44 molded glass lens
46 lens body
48 free-formed perimeter
50 molded three-dimensional reference surface
52 first molded optical surface
54 second molded optical surface 60 alternative apparatus
61 molded glass lens
62 upper mold
64 lower mold
66 upper mold sleeve
68 lower mold sleeve
70 first optical mold surface PARTS LIST cont.

72 three-dimensional reference mold surface
73 glass preform
74 second optical mold surface
75 cavity
76 first optical mold surface
78 second optical mold surface
80 molded three-dimensional reference surface
81 annular channel
100 molded glass lens
102 lens body
104 molded three-dimensional reference surface
106 first molded optical surface
107 molded three-dimensional reference surface
108 second molded optical surface
109 cylindrical axis
110 molded glass lens
112 lens body
114 molded three-dimensional reference surface
116 first molded optical surface
118 second molded optical surface
120 cylindrical axis
122 cylindrical surface
126 flat reference surface or datum
130 molded glass lens
132 lens body
134 molded three-dimensional reference
136 first molded optical surface
138 second optical surface
140 cylindrical axis
142 recess
150 first optical fiber PARTS LIST cont.

152 second optical fiber
154 first lens
156 second lens
158 collimated beam
162 optical surface
164 second optical surface
170 molded glass lens
172 convex optical lens
174 convex optical surface
180 molded glass lens
182 convex optical surface
184 convex optical surface
186 reference surface
188 reference surface
190 first centering cup
192 second centering cup
194 grinding wheel

What is claimed is:

1. A molded lens element comprising:
   (a) a lens body;
   (b) a three-dimensional reference surface at a first end of the lens body;
   (c) a first optical surface intercepting the three-dimensional reference surface; and
   (d) a second optical surface proximate a second end of the lens body.

2. A molded lens element as recited in claim 1 wherein: the lens body is generally cylindrical.

3. A molded lens element as recited in claim 2 wherein: the first optical surface is plano and at an angle with respect to an optical axis of the lens body that is not perpendicular thereto.

4. A molded lens element as recited in claim 3 wherein: the lens body is generally circular in cross-section.

5. A molded lens element as recited in claim 2 further comprising:
   a flat datum surface in the generally cylindrical lens body parallel to a cylindrical axis thereof.

6. A molded lens element as recited in claim 5 wherein: the flat datum surface is molded in the generally cylindrical body.

7. A molded lens element as recited in claim 5 wherein: the flat datum surface is machined in the generally cylindrical body.

8. A molded lens element as recited in claim 2 further comprising:
   an annular recess datum machined into the generally cylindrical body between the three-dimensional reference surface and the convex optical surface.

9. A molded lens element as recited in claim 2 further comprising:
   at least one arcuate recess datum machined into the generally cylindrical body between the three-dimensional reference surface and the convex optical surface.

10. A molded lens element as recited in claim 2 further comprising:
    a second three-dimensional reference surface molded at a second end of the generally cylindrical lens body between the generally cylindrical lens body and the second optical surface.

11. A molded lens element as recited in claim 1 wherein: the three-dimensional reference surface at the end of the lens body is spherical.

12. A molded lens element as recited in claim 1 wherein: the three-dimensional reference surface at the first end of the lens body is aspherical.

13. A molded lens element as recited in claim 1 wherein: the three-dimensional reference surface at the first end of the lens body is conical.

14. A molded lens element as recited in claim 10 wherein: the second three-dimensional reference surface is spherical.

15. A molded lens element as recited in claim 10 wherein: the second three-dimensional reference surface is aspherical.

16. A molded lens element as recited in claim 10 wherein: the second three-dimensional reference surface is conical.

17. A molded lens element as recited in claim 1 wherein: the first optical surface is plano.

18. A molded lens element as recited in claim 17 wherein: the second optical surface is convex.

19. A molded lens element as recited in claim 1 wherein: the first optical surface is convex.

20. A molded lens element as recited in claim 19 wherein: the second optical surface is convex.

21. A molded lens element as recited in claim 19 wherein: the second optical surface is concave.

22. A molded lens element as recited in claim 17 wherein: the second optical surface is concave.

\* \* \* \* \*